(12) United States Patent
Komsitsky et al.

(10) Patent No.: US 9,028,186 B2
(45) Date of Patent: May 12, 2015

(54) HOLD DOWN ASSEMBLIES AND METHODS

(75) Inventors: Igor Komsitsky, Los Angeles, CA (US); Javier Torres, Hacienda Heights, CA (US); Terrence Csik, Pasadena, CA (US)

(73) Assignee: The Monadnock Company, City of Industry, CA (US)

( * ) Notice: Subject to any disclaimer, the term of this patent is extended or adjusted under 35 U.S.C. 154(b) by 336 days.

(21) Appl. No.: 13/228,392

(22) Filed: Sep. 8, 2011

(65) Prior Publication Data

US 2012/0141225 A1   Jun. 7, 2012

Related U.S. Application Data

(60) Provisional application No. 61/380,717, filed on Sep. 8, 2010.

(51) Int. Cl.
| | |
|---|---|
| *F16B 39/24* | (2006.01) |
| *F16B 39/282* | (2006.01) |
| *F16B 39/12* | (2006.01) |
| *F16B 45/00* | (2006.01) |

(52) U.S. Cl.
CPC ............... *F16B 39/282* (2013.01); *F16B 39/12* (2013.01); *F16B 45/00* (2013.01)

(58) Field of Classification Search
CPC ..... F16B 39/292; F16B 45/00; A01B 12/006; B21D 53/24
USPC ......... 411/190, 138, 141, 205, 327, 330, 332, 411/962, 953, 432
IPC ...................................................... F16B 39/24
See application file for complete search history.

(56) References Cited

U.S. PATENT DOCUMENTS

| | | | | |
|---|---|---|---|---|
| 477,149 | A * | 6/1892 | Parrot ......................... | 411/144 |
| 721,990 | A * | 3/1903 | Young .......................... | 411/327 |
| 964,813 | A * | 7/1910 | Roedler ....................... | 411/118 |
| 1,646,805 | A * | 10/1927 | Bell ............................. | 411/329 |
| 2,737,222 | A * | 3/1956 | Becker ........................ | 411/105 |
| RE24,488 | E | 6/1958 | Demurjian | |
| 2,966,187 | A * | 12/1960 | Ter Cock ..................... | 411/330 |
| 3,282,316 | A * | 11/1966 | Griswold ..................... | 411/326 |
| 3,670,795 | A * | 6/1972 | Kupfrian ..................... | 411/195 |
| 3,877,672 | A * | 4/1975 | Wright ......................... | 248/503 |

(Continued)

FOREIGN PATENT DOCUMENTS

| | | |
|---|---|---|
| GB | 2404708 | 9/2005 |
| WO | WO8706664 | 11/1987 |
| WO | WO 200835639 | 3/2008 |

*Primary Examiner* — Gary Estremsky
(74) *Attorney, Agent, or Firm* — Henricks, Slavin & Holmes LLP

(57) ABSTRACT

A nut assembly and a holddown assembly using the nut assembly are described, including methods of manufacture and assembly. The nut assembly may include a body portion having first and second openings with an internal wall extending between them. A rotation-inhibiting wall may be included between the first and second openings. A nut portion configured to move axially within the internal wall of the body portion includes structures for co-acting with a rotation-inhibiting wall to limit or prevent rotation of the body portion and the nut portion relative to each other. A nut portion and a body portion extending around the nut portion have limited axial movement relative to each other due to axial engagement between adjacent surfaces on the nut portion and the body portion.

19 Claims, 5 Drawing Sheets

(56) References Cited

U.S. PATENT DOCUMENTS

| | | |
|---|---|---|
| 4,495,380 A | 1/1985 | Ryan et al. |
| 4,863,326 A * | 9/1989 | Vickers .................. 411/105 |
| 4,954,032 A | 9/1990 | Morales |
| 5,008,777 A | 4/1991 | Burns |
| 5,370,693 A | 12/1994 | Kelman et al. |
| 5,448,018 A | 9/1995 | Burtelson |
| 5,466,106 A * | 11/1995 | Bone et al. .................. 411/433 |
| 5,732,989 A | 3/1998 | Stevenson et al. |
| 5,944,467 A | 8/1999 | Yuta |
| 6,139,113 A | 10/2000 | Seliga |
| 6,361,260 B1 | 3/2002 | Schirrmacher |
| 6,439,816 B1 * | 8/2002 | Nance et al. .................. 411/108 |
| 6,461,092 B2 | 10/2002 | Tseng |
| 6,517,301 B2 | 2/2003 | Hartmann et al. |
| 6,535,394 B1 | 3/2003 | Hirzmann |
| 6,543,098 B2 | 4/2003 | Meyer et al. |
| 6,863,562 B1 | 3/2005 | Jensen et al. |
| 6,939,073 B1 | 9/2005 | Ahmed et al. |
| 7,057,895 B2 | 6/2006 | Mejia et al. |
| 7,151,677 B2 | 12/2006 | Le et al. |
| 7,762,030 B2 | 7/2010 | Espinosa |
| 2004/0228701 A1 * | 11/2004 | Blatz .................. 411/190 |
| 2008/0179883 A1 | 7/2008 | Fullerton |
| 2009/0324364 A1 | 12/2009 | Smith |
| 2010/0129178 A1 | 5/2010 | Smith |
| 2011/0188970 A1 | 8/2011 | Dillon et al. |

* cited by examiner

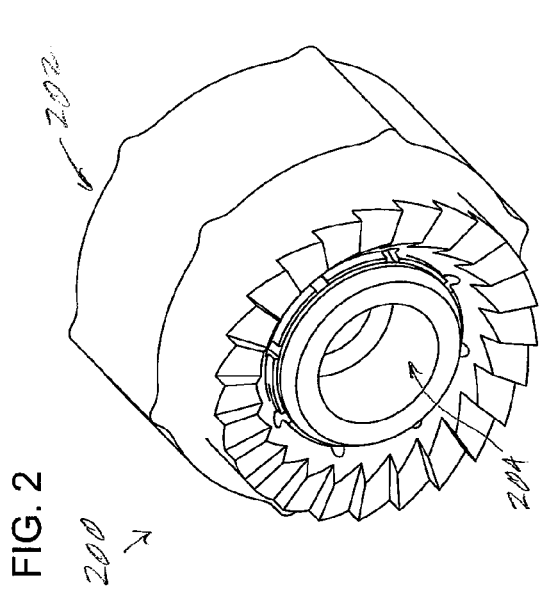
FIG. 2
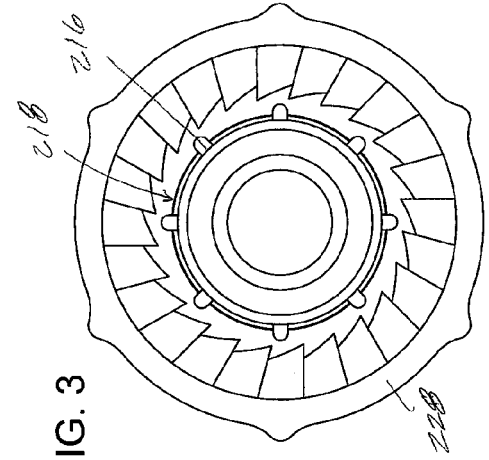
FIG. 3
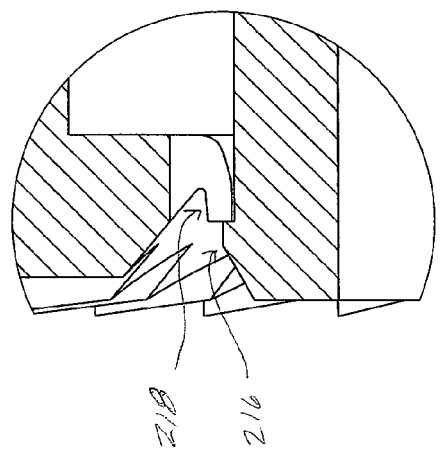
FIG. 5A
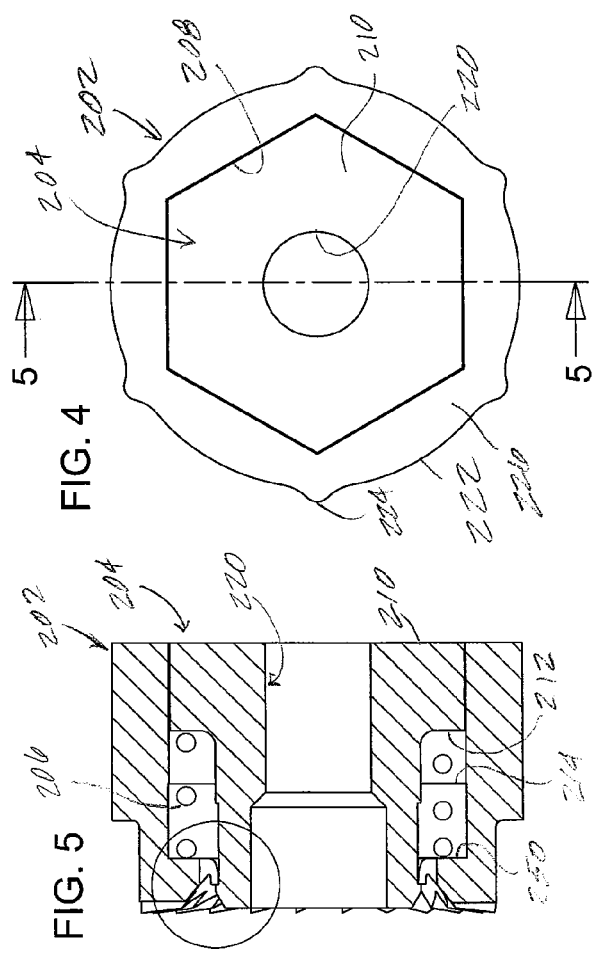
FIG. 4
FIG. 5

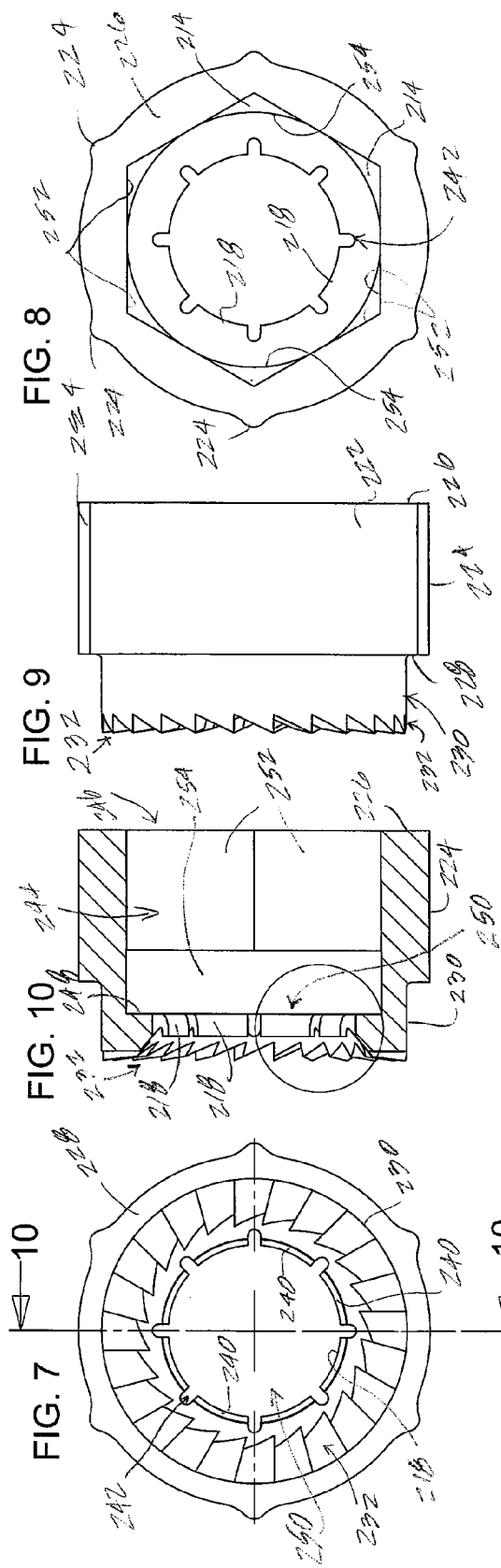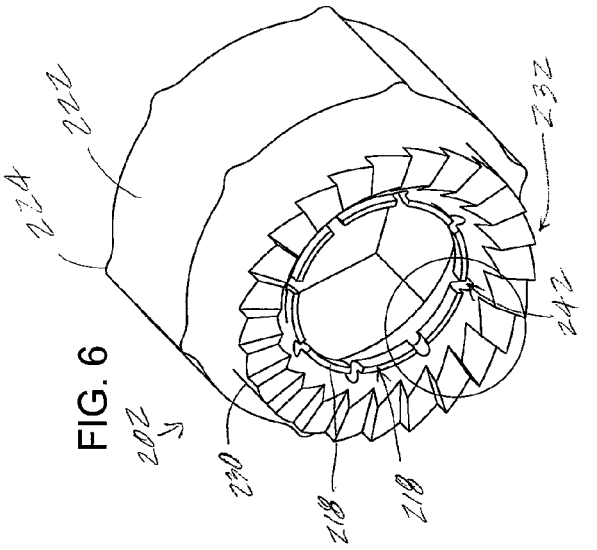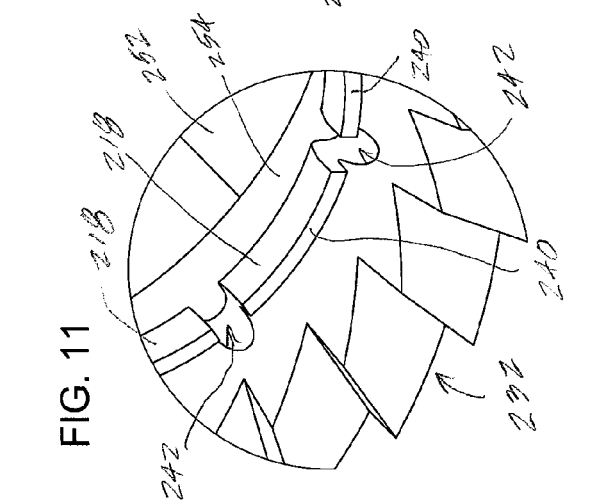

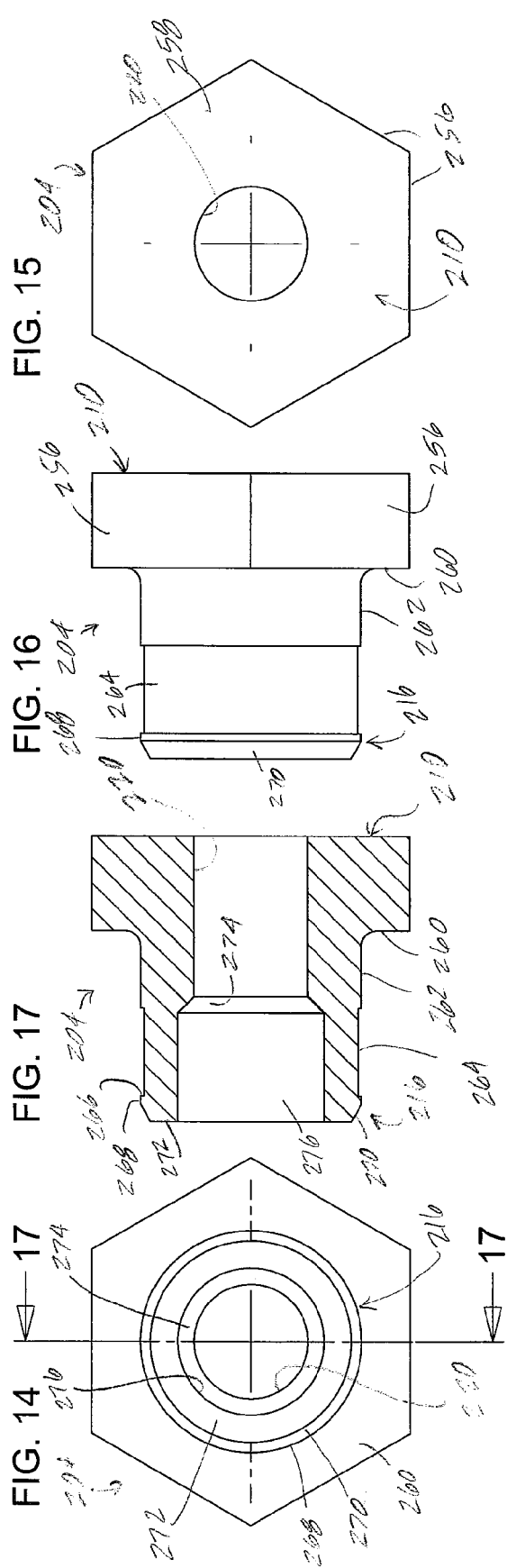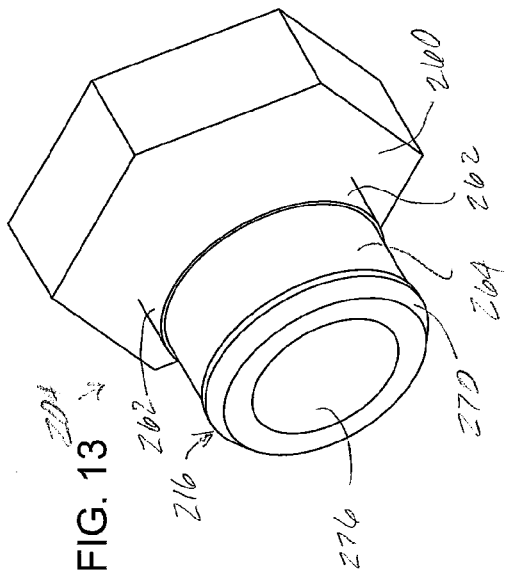

HOLD DOWN ASSEMBLIES AND METHODS

CROSS-REFERENCE TO RELATED APPLICATIONS

This application claims the benefit of provisional application No. 61/380,717, filed Sep. 8, 2010, the contents of which are incorporated herein by reference.

BACKGROUND

Field

This relates to hold down assemblies and other retaining assemblies commonly known as swing bolts, J-hook bolts, hold down devices, locking clamp bolts, and similar fastening assemblies, as well as sub-assemblies used there with, and methods of making and assembling such assemblies and components of such assemblies.

SUMMARY

One or more of these methods and assemblies can provide more efficient manufacturing processes, lower material costs, lower part counts, lighter assemblies, and/or more reliable assemblies. Several of the components can be combined with other conventional components to provide improved assemblies.

In one example, a nut is provided for a holddown assembly having a body, a nut and a spring. The body includes first and second openings and an internal wall between the openings. In one example, the body can include a wall for supporting a separate spring. The body includes a rotation-inhibiting wall between the first and second openings. The nut portion can be positioned in the body and is configured to move axially within the body, such as within the internal wall. The nut portion includes one or more surfaces at least partly complementary to the rotation-inhibiting wall in the body so that the body and the nut portion have little or no rotation relative to each other. The nut portion and body portion are configured to allow axial movement between the two. The rotation-inhibiting wall or walls in the respective component can also be other surface(s) inhibiting rotation. The rotation-inhibiting surfaces can be formed integral, and can be monolithic, with their respective components. In one example, the rotation-inhibiting surface in the body portion is formed by at least two substantially flat surfaces formed at an angle to each other and extending axially of the body, and the complementary surface on the nut portion are at least two substantially flat surfaces formed at a similar angle to each other. In another example, the rotation-inhibiting surfaces are hex surfaces formed in the components. Inhibiting rotation can also be done by other polygonal surfaces than hexagonal, non-straight surfaces, such as eccentric surfaces, for example, or a combination of surfaces, for example some curved and some flat. In one example, the body portion and the rotation-inhibiting surface or surfaces are monolithic, in another example the nut portion and the rotation-inhibiting surface or surfaces are monolithic, and in a further example both of the body portion and surface or surfaces are monolithic and the nut portion and the surface or surfaces are monolithic. Inhibiting rotation of the two components relative to each other can be easily accomplished without any need for additional fasteners, pins or other limit elements. Axial movement between the nut portion and the body portion can be restricted or limited by any conventional means presently known, or by any of the means described herein.

In any of the examples herein, the nut portion and body portion can be configured to move axially relative to each other over a defined distance based on one or more surfaces formed on the nut portion and the body portion. For example, the separation of the nut portion and the body portion is limited by a retainer or retaining element, for example a shoulder on one portion and a lip on the other. In another example, separation is limited by a form of collet on the body portion and an outwardly extending ridge or ridge portions on the nut portion. The retainer may be at a forward portion of the nut portion, and may be adjacent a locking cup or catch for the assembly. The retainer may be internal to the body portion, and for example could be configured to have no portion of the retainer extend radially through the wall of the body portion, for example, the retainer does not extend through a wall of the body portion in the manner of existing pins, and both the nut portion and the body portion have cylindrical walls that are adjacent each other and without any significant openings or passageways through one or the other of the cylindrical walls, or through either of the cylindrical walls over their axial extent. The retainer may also be configured to be protected from side impact by being placed radially inside a perimeter wall of the body portion.

For axial movement in the other direction, insertion of the nut element further into the body is limited by one or more stop surfaces on the internal wall of the body and one or more complementary surfaces on the nut portion. In another example for axial movement in the other direction, a spring or other bias element can limit the amount of insertion or axial displacement into the body of the nut element. With the particular examples described herein for limiting axial movement of the nut portion and the body portion relative to each other, rotational movement of the two portions relative to each other can be limited or prevented instead or in addition by any conventional means presently known or by any of the means described herein.

In the examples described herein, axial movement between the nut portion and the body portion can be limited by a resilient catch, a resilient retainer, a resilient barrier or other resilient element on one of the nut and body portions that can be releasably moved when the nut portion and the body portion are pushed together, after which it returns to a position for preventing the two portions from completely separating relative to each other. The other of the two portions includes a ridge, shoulder, projection, extension or other protrusion for moving or camming the resilient element, and possibly as well as a space, groove, pocket or a depression for receiving the resilient element to allow the resilient element to return to or toward its original position. It is desirable to have the resilient element or elements formed as part of the body portion or the nut portion, as the case may be, for example monolithic there with. It is also desirable to have the projection also formed as part of the other of the body portion or the nut portion, for example monolithic there with. In such a case, a separate pin, fastener, stop or other element need not be inserted between the two portions after assembly for limiting axial movement.

The axial movement limiting elements can be incorporated into the nut portion and in the body portion at a number of locations, and the rotation-limiting elements can be incorporated into the nut portion and in the body portion at a number of locations. In one example, the rotation-limiting elements are positioned at one end area of the nut and body portions, and in another example, the axial-limiting elements can be placed at the other end area of the nut and body portions, or in a further example they can be placed intermediate the end areas of the nut and body portions.

In one example of a holddown nut assembly, a body portion has first and second openings with a nut portion extending into the first opening and into the second opening. A first interior wall of the body portion at the first opening includes hex surfaces and a head of the nut portion includes complimentary hex surfaces. A second interior wall of the body portion at the second opening includes one or more resilient elements to be temporarily moved by an external shoulder or other surface on the nut portion, for example on a second end of the nut portion, as the second end extends into the second opening. As the one or more resilient elements pass over or across the adjacent shoulder on the nut portion, they return toward or to their original position. Thereafter, the nut portion is both axially captured by the body portion and has limited or no rotational freedom relative to the body portion. In this example, the one or more resilient elements then extend in a groove or reduced perimeter area of the nut portion, thereby allowing the nut portion to move axially relative to the body portion. The resilient element or elements limit or prevent the withdrawal of the nut portion from the body portion without destroying or substantially compromising the structural integrity of the resilient element or elements. "Compromising the structural integrity" as used herein means that the component, in this example the resilient element or elements, are not acceptable for the intended application, for example because they do not meet the structural, strength, lifetime or other requirements of the component. In this example also, a second interior wall of the body portion forms at least one shoulder or ledge which part of the nut portion contacts to limit or restrict further axial movement of the nut portion into the body portion. In one example, the interior portion of the hex head of the nut portion contacts the at least one shoulder or ledge. The second end of the body portion may also include axially facing ratchet teeth for engaging corresponding or complementary surfaces on an adjacent assembly component, for example a locking cup for a swing bolt. In all of the examples described herein for use in an assembly for a holddown, swing bolt, locking clamp bolt, or J-hook bolt having a threaded bolt, the nut portion includes a bore having at least a partially threaded wall for engaging the threaded bolt. Where the assembly engages surfaces on a stud or pin other than threads, the bore surface inside the nut portion would have complementary engaging surfaces. The body portion may also have gripping surfaces on the external perimeter or other surface forms for allowing reliable manipulation of the body portion, whether manually or with a tool. For example, the body portion maybe easily turned or moved axially for threading the nut assembly along the bolt or pin.

Where the nut assembly is to be used with a swing bolt, a holddown assembly, locking clamp bolt or J-hook bolt, or similar assemblies, the bolt is securely mounted to the intended support structure. A mating element such as a locking cup or catch is passed along the shaft of the bolt, followed by the nut assembly threading onto the bolt. A bearing washer may be placed between the locking cup and the nut assembly. A retainer may then be placed on the free end of the bolt to keep the nut assembly and the locking cup or catch on the bolt. The assembly can then be used to reliably hold a cover, housing or other component on which is securely mounted a J-hook by placing the locking cup or catch over the free end of the J-hook and tightening the nut assembly and locking cup against the J-hook.

The body portion and the nut portion can be made from a number of materials. For example, they can be made from metal, structural or engineered plastics, powdered metals, as well as other materials. The nut portion can be formed from steel, aluminum, Torlon® and other poly-amide imides, as well as other structural or engineered plastics or polymers, including among others; Vespel or Aurum (PI), Ultem (PEI), Victrex or Ketaspire (PEEK), Primospire (SRP), Polycarbonate, or Epoxide or Phenolic synthetic resins, or powdered metals. Where the loading is relatively light on the nut assembly, Torlon® may be a suitable material for the nut portion. Under heavier load conditions, powdered metal is a good material for making the nut portion easier to fabricate. The body portion can be made from a similar variety of materials, and under heavy and light load conditions, the body portion can even be made from lighter plastics, such as Torlon®, or composites. The spring internal to the body portion biasing the nut portion out of the body portion can be any conventional spring used in such applications.

For assembly in one example, a spring is placed into the first opening of the body portion. The nut portion is inserted nose first into the first opening of the body portion in such a way that the hex head of the nut portion mates or aligns with the hex opening of the body portion. The forward portion of the hex head bears against the spring and the preceding or front part of the nut portion bears against the resilient element or elements at the second opening of the body portion. With further forward progress, the sideways or outward protrusion at the front part of the nut portion flexes the resilient element or elements allowing the protrusion to pass through the second opening while compressing the spring. Further axial movement of the nut portion relative to the body portion compresses the spring further and moves the hex head further into the body portion and the forward part of the nut portion further through the second opening, eventually allowing the resilient element or elements either partly or completely to their relaxed configuration. In another example, the resilient element or elements can remain radially outwardly flexed, and the sideways or outward protrusion at the front part of the nut portion can extend outward to axially engage the resilient element or elements. When the nut portion is released, the spring biases the nut portion outward relative to the first opening until the protrusion on the nut portion contacts the resilient element or elements. The nut assembly is then ready to be assembled as needed.

In an example of a method for assembling a portion of a holddown assembly, the spring is placed into a first opening of a body portion and a nut portion is inserted nose first into the first opening of the body portion in such a way that a polygonal, in one example a hex, head on the nut portion mates or aligns with a polygonal opening, in one example a hex opening, on the body portion. The forward portion of the hex head bears against the spring and a preceding or front portion of the nut portion without any radial extension passes beyond the end of a bore wall of the body portion. Thereafter, the preceding or front portion of the nut portion is swaged (for example with a swage tool) or otherwise deformed outwardly to extend radially outward over a portion of the end of the bore wall of the body portion so that the swaged portion and the adjacent end of the bore wall limit axial movement of the nut portion and the body portion relative to each other, and in opposition to the bias provided by a spring biasing the body portion and the nut portion axially apart. In this configuration, a resilient element or elements can be omitted if desired from the body portion and/or the nut portion, for example because there is little or no engagement when the nut portion and the body portion initially slide axially together.

These and other examples are set forth more fully below in conjunction with drawings, a brief description of which follows.

BRIEF DESCRIPTION OF THE DRAWINGS

FIG. 2 is an isometric view of an alternative nut assembly.

FIG. 3 is a front elevation view of the nut assembly of FIG. 2.

FIG. 4 is a back elevation view of the nut assembly of FIG. 2.

FIG. 5 is a longitudinal cross-section of the nut assembly of FIG. 4 taken along line 5-5.

FIG. 5A is a detailed view of a portion of the cross-section of FIG. 5.

FIG. 6 is an isometric view of a body portion for use in the nut assembly of FIG. 2.

FIG. 7 is a front elevation view of the body portion of FIG. 6.

FIG. 8 is a back elevation view of the body portion of FIG. 6.

FIG. 9 is a right-sided elevation view of the body portion of FIG. 6.

FIG. 10 is a longitudinal cross-section of the body portion of FIG. 6 taken along line 10-10 of FIG. 7.

FIG. 11 is a detailed view of a portion of the body portion of FIG. 6.

FIG. 12 is a detailed view of a portion of the cross-section of the body portion as shown in FIG. 10.

FIG. 13 is an isometric view of a nut portion for use with the nut assembly of FIG. 2.

FIG. 14 is a front elevation view of the nut portion of FIG. 13.

FIG. 15 is a back elevation view of the nut portion of FIG. 13.

FIG. 16 is a right-sided elevation view of the nut portion of FIG. 13.

FIG. 17 is a transverse cross-section of the nut portion of FIG. 13 taken along line 17-17 shown in FIG. 14.

DETAILED DESCRIPTION

Figure 1:
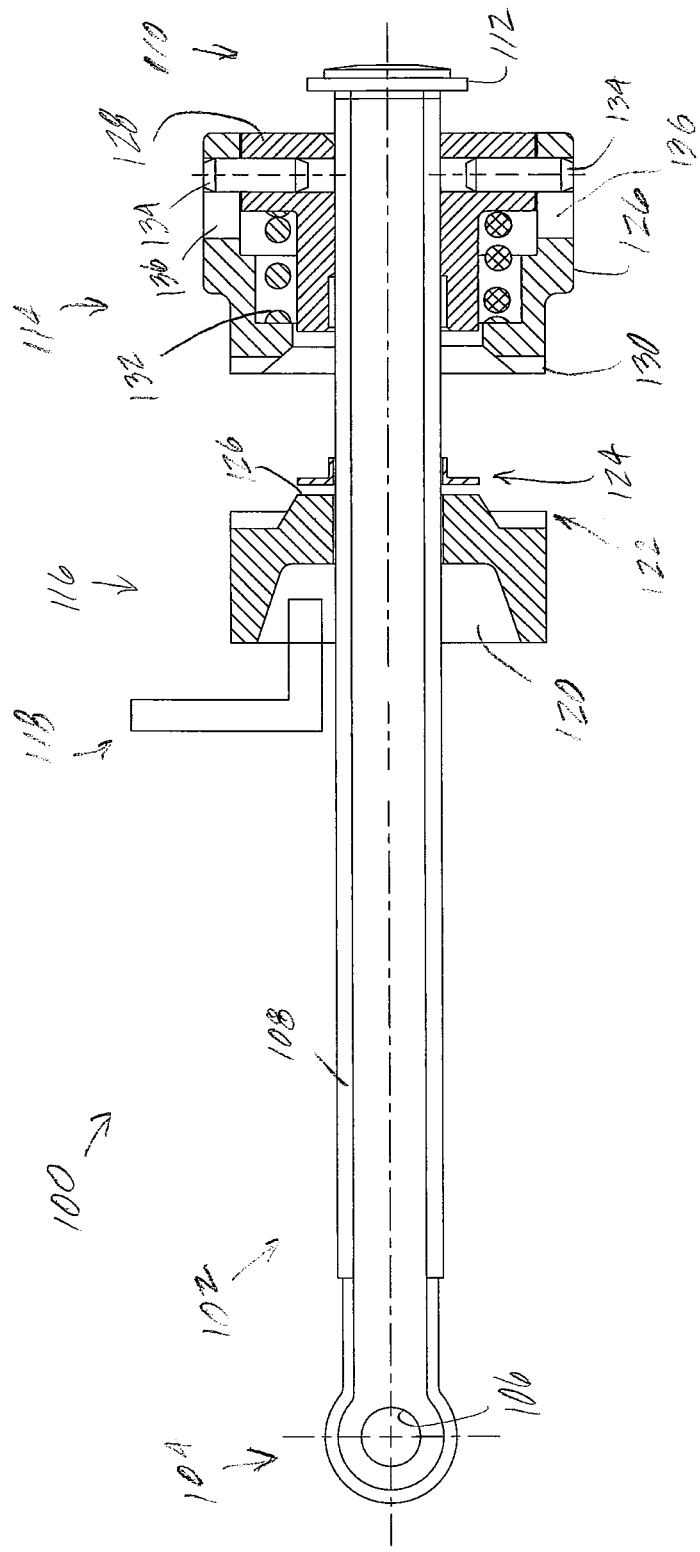
FIG. 1 is a side and partial longitudinal section view of a locking clamp bolt according to a conventional configuration showing a nut assembly and a locking cup disposed on a threaded bolt.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of hold downs and of methods of making and using the hold downs are described. Depending on what feature or features are incorporated in a given structure or a given method, benefits can be achieved in the structure or the method. For example, hold downs formed from composites or structural plastics, or combinations of metal and composites or structural plastics may lighter assemblies and longer product lifetime. Additionally, some hold down configurations and their assemblies may also benefit from lower-cost and reduced wear.

In some configurations of hold downs, improvements can be achieved also in assembly, and in some configurations, a relatively small number of components can be used to provide a reliable hold down. Improvements are also provided to components with which the hold downs may be used. For example, hold downs and their associated structures on which they are used may be simplified or made more efficient.

These and other benefits will become more apparent with consideration of the description of the examples herein. However, it should be understood that not all of the benefits or features discussed with respect to a particular example must be incorporated into a hold down, component or method in order to achieve one or more benefits contemplated by these examples. Additionally, it should be understood that features of the examples can be incorporated into a hold down, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of hold down configurations and of methods of making and using the hold downs are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

It should be understood that terminology used for orientation, such as front, rear, side, left and right, upper and lower, and the like, are used herein merely for ease of understanding and reference, and are not used as exclusive terms for the structures being described and illustrated.

A conventional holddown assembly 100 is shown in FIG. 1. The assembly includes a bolt 102 with an enlarged eyelet 104 with an opening 106 at a first end for mounting to a support structure through an appropriate bracket (not shown). The bolt is secured to the bracket by a pin (also not shown) secured in place by a suitable holding elements such as, for example, a cotter pin. The bolt is threaded over substantially the entire length with threads 108 to a second end 110 where a stop plate or bearing washer 112 is secured for keeping a nut assembly 114 and therefore a locking cup 116 in place. With some bolts, the bolt may include oppositely-facing flats on a part of the bolt near the eyelet, while the remaining surface between each flat has threads, as does the remainder of the length. A J-hook 118 would be secured to a cover, housing or other component to be secured in place relative to the support structure to which the bracket and therefore the holddown assembly is mounted.

The locking cup 116 can slide freely along the bolt 102. It does not engage the threads 108 of the bolt. The locking cup includes a cavity or cup 120 for engaging a portion of the J-hook 118. The locking cup includes ratchet teeth 122 for engaging complementary ratchet teeth on the nut assembly 114. A thrust bearing or washer 124 bears against a relatively flat surface 126 above the teeth 122.

The nut assembly 114 includes a knob 126 substantially enclosing a nut 128. The knob includes complimentary teeth 130 facing axially outward toward the teeth 122 on the locking cup. A compression type spring 132 interior to the knob 126 biases the nut 128 axially relative to the knob 126. Pins 134 prevent the nut 128 from moving backward beyond the back surface of the knob 126. Longitudinal elliptical grooves 136 allow limited movement of the pins 134 and therefore the nut 128 relative to the knob 126. The nut 128 is internally threaded and engages the threads 108 over a portion of the length of the nut. Operation and use of the holddown assembly is known to those skilled in the art.

An alternative nut assembly can be used in place of the nut assembly 114 shown in FIG. 1. An example nut assembly 200 (FIGS. 2-5A) includes a body portion 202 and a nut portion 204. The body portion 202 is shown in more detail in FIGS. 6-12, and the nut portion 204 is shown in more detail in FIGS. 13-17. Considering the assembly 200 further, the assembly includes a spring such as compression spring 206 biasing the nut portion 204 out of the body portion 202 in a direction to the right as seen in FIG. 5 relative to the body portion. The body portion 202 and the nut portion 204 include complementary surfaces for limiting or preventing rotational movement relative to each other. In one example shown in the drawings, the body portion 202 includes hex surfaces 208 and the nut portion 204 includes a hex head 210 for engaging each other and substantially preventing rotation relative to each other. Other surface configurations can be used, including triangular, square or rectangular, eccentric or other noncircular surfaces. Such configurations inhibit rotation of the body and nut portions relative to each other without a need for additional fasteners, pins or other rotation limiting elements. In the present examples, it is desirable for the surfaces to permit axial movement of the nut portion relative to the body portion, though it is possible that the assembly could be configured so that the hex head 210 need not move axially relative to the body portion 202 while still allowing other parts of the body portion and the nut portion to move axially relative to each other. In the present examples, however, the body portion 202 is monolithic or otherwise the body portion is configured so that all parts thereof move together, and the nut portion 204 is monolithic or otherwise the nut portion is configured so that all parts thereof move together. As a result, the body portion and the nut portion are configured to allow axial movement between the two.

In the present example shown in FIGS. 2-5A, the body portion and the nut portion move axially relative to each other over a defined distance based on surfaces formed on the body portion and on the nut portion. Axial movement of the body portion 202 backward relative to the nut portion 204, for example when viewing FIG. 5, against the bias of spring 206 is limited by the forward side surface 212 on the hex head 210 and by one or more radially inwardly extending surfaces 214 in the interior of the body portion 202. In another example not shown, relative axial movement in the same direction can be limited by full compression of the spring 206 if the surfaces 214 were omitted or moved farther from the forward surface 212 than the overall compressed length of the spring 206.

Axial movement of the body portion 202 forward relative to the nut portion, in the direction of the spring bias, is limited by at least one complementary set of limit surfaces or stop surfaces between the body portion 202 and the nut portion 204. For example, one of the body portion and the nut portion can have a projection and the other can have a complementary projection that can contact each other when the desired axial extent of motion between the two has been reached. In the example shown in FIG. 5 and FIG. 5A, one portion has a shoulder portion and the other element has a lip portion. In the present example, a shoulder portion 216 extends circumferentially around a forward part of the nut portion, and one or more lip elements 218 extend from an inside surface of the body portion 202. In the present example of the body portion 202, a plurality of lip elements 218 provide a form of collet on the body portion. Also in the present example, the lip elements 218 are relatively flexible and resilient to allow easier assembly of the nut assembly 200 (flexible relative to the adjacent structure of the nut element). In the examples described herein, flexibility of the lip elements (as well as any of the flexible elements of the examples) can be configured through a combination of selection of material and the structural design of each lip element. For a given material, flexibility can be increased or decreased based on material thickness, bending moment or length of the structure as well as width. The width of a lip element may be more significant with an arcuate or angular element such as the lip elements 218 compared to non-angular elements.

Axial movement can also be limited by a resilient catch, a resilient retainer, a resilient barrier or other resilient element on one of the body and nut portions. The resilient element can be releasably moved when the body portion and the nut portion are pushed together for assembly, after which the resilient element returns toward or to a position for preventing the two portions from completely separating from each other. In the present example shown in the drawings, resilient elements are placed on the body portion, but they can be placed on the nut portion instead of or in addition to being placed on the body portion. In an example where the resilient elements are placed on the nut portion, the body portion can include the radially-extending front wall 248 (described with respect to FIG. 12) could terminate at a radially-facing, circumferential face that would extend around the adjacent portion of the nut portion. The resilient elements on the nut portion would contact the adjacent wall on the body portion during assembly, flex inward, and pass within and beyond the body portion wall. After assembly, rearwardly-facing surfaces on respective ones of the resilient elements on the nut portion would contact the adjacent wall surface on the body portion, thereby forming an axial contact that inhibits separation of the nut portion from the body portion in spite of the bias created by a spring between the body portion and the nut portion. Therefore, it can be seen that the resilient elements 218 on the body portion and a shoulder portion 216 on the nut portion can be reversed or transposed, so that resilient elements are on the nut portion and a shoulder portion or other cam-type surface is on the body portion. In another example, positioning and orientation of resilient elements and shoulder portions or cam-type surfaces can be alternated between the nut portion and the body portion so that each includes both resilient elements and shoulder portions or cam-type surfaces. In such an example, the positioning and orientation of the resilient elements and shoulder portions or cam-type surfaces can be keyed or tied to the positioning of the hex surfaces or equivalent rotation-inhibiting surfaces.

Also in the present example of FIG. 5 and FIG. 5A, the shoulder portion 216 extends circumferentially around all of the forward part of the nut portion. In other examples, the shoulder portion can be a segment less than a complete rotation, can take the form of a ridge, projection, extension or a form of protrusion. Where the body portion includes one or more resilient elements, these portions on the nut portion move or cam the resilient element or elements during assembly of the body and nut portions.

It also should be understood that, in part because at least some of the axial-limiting surfaces on the body portion and on the nut portion are complementary in the example shown in the FIGS., the surfaces can be reversed in whole or in part while still achieving at least part of the desired function. The locations of these elements may be selected as a function of ease of manufacture, for example, such as where collets may be relatively more difficult to form on a powder metal nut portion than on a composite or structural plastic body portion. Resilient elements can be placed at other axial locations on the body portion and can also or instead be placed on the nut portion, either at the second opening or at other axial locations on the nut portion. Likewise, protrusions or complimentary surfaces can be placed appropriately to bear against or cam the resilient elements and/or form stop surfaces therewith to limit or prevent separation of the body and nut portions, as desired. In the example shown in FIGS. 2-5A, the body portion 202 and the nut portion 204 are inter-fitting and interlocking. They allow a desired amount of axial movement relative to each other, which may be accomplished without the use of pins, fasteners or other elements formed as a part of one or the other of the body portion 202 and nut portion 204, for example not monolithic with one or the other. One portion is non-rotating relative to the other but they can slide relative to each other over a limited or defined range or distance.

The nut portion 204 includes a cylindrical threaded bore 220 (FIGS. 4 and 5). The nut assembly 200 is threaded onto the bolt or other threaded element for securing the desired structure. For example, the nut assembly 200 can be threaded onto a bolt 102 to bear against a washer 124 and secure a locking cup or catch 116. The nut assembly 200 can also be used in other applications on other structures.

Considering the body portion 202 in more detail with respect to FIGS. 2-12, the body portion includes a substantially cylindrical body surface wall 222, in the present case having a plurality of axially-extending gripping ridges 224. Six gripping ridges 224 are included in the present example. The cylindrical wall 222 extends from a back surface 226 (FIG. 4) to a forward shoulder 228, facing axially forward in a direction opposite the direction in which the back wall 226 is facing. The forward shoulder 228 extends substantially around the entire perimeter of the body portion. The forward shoulder terminates at a forward cylindrical wall 230 (FIGS. 6-7 and 9-10). In the present example, the forward cylindrical wall 230 supports the resilient elements 218 and also supports ratchet teeth 232 facing axially forward from the forward cylindrical wall 230.

The number, size and spacing of the resilient elements 218 may depend on the expected loading applied by the spring 206, and possibly on the magnitude of the expected side impacts that may occur during operation. They also may depend on the size of the nut assembly 200 and on the material from which the body portion is formed. In the present example, eight resilient elements are uniformly distributed around an inside surface of the cylindrical wall 230, initially extending radially inward from the wall. In side profile and in longitudinal cross-section, each resilient element in the present example converges radially inward on a trapezoid-shaped or other converging base 234. Flexing may occur in the resilient element beginning at a transition area 236 where the resilient element transitions from a radially inward direction to add an axially forward-extending direction in a forward segment 238 of the resilient element. The cross-section of the forward segment 238 is relatively constant in the present example as the forward segment extends axially forward to a forward end face 240 (FIGS. 7 and 11-12). In the present example, each forward segment extends axially forward substantially parallel to a central axis of the body portion 202. All or any portion of the forward segment 238 may flex as a protruding surface on the nut portion bears against or cams each resilient element. The portion of the resilient element that moves or flexes will depend on the material and the geometry of the resilient element, as well as possibly the geometry of the protrusion on the nut portion. The resilient element or elements combined with the protrusion or shoulder or other structures on the nut element to allow easy assembly of the nut assembly 200. Once they are assembled, it is believed that the resilient elements undergo very little if any flexing during normal operation unless as a result of side impact.

Each forward end face 240 can serve as a stop surface or a limiting surface against which a corresponding surface on the nut portion 202 will contact. Whether or not contact occurs will depend on the number and configuration of the corresponding surface on the nut portion. In the present example, the forward end face 240 on each resilient element is substantially flat and coplanar with each of the other end faces. The orientation and geometry of the end face may be selected as a function of the orientation and geometry of a corresponding surface on the nut portion. That orientation and geometry is described more fully below with respect to FIGS. 13-17.

In selecting a configuration for the resilient elements and their end faces, it may be desirable to take into account the material strength of the body portion and a surface area of contact in the axial direction on the end faces 240. For example, the strength may be selected to be higher than the sheer strength provided by the pins 134 (FIG. 1) in conventional hold down assemblies. Other factors may also be taken into account.

Adjacent resilient elements 218 are separated by axially extending grooves or troughs 242 (FIGS. 6-8 and 11). Each groove has a substantially U-shaped cross-section transverse to the central axis of the body portion. The depth of each groove may depend on the amount of resiliency to be provided for each resilient element, and the maximum spacing between adjacent resilient elements may depend on the anticipated axial loading during operation, as well as the desired flexing during assembly of the body portion and nut portion. The groove depth and the spacing may also depend on the material used.

The body portion includes an interior wall 244 extending from the back face 226 defining a first opening 246 in the body portion having a substantially hexagonal cross-section. The interior wall extends axially forward to a front wall 248 (FIGS. 10 and 12), where the front wall 248 and the resilient elements 218 formed thereon define a second or forward opening 250. As shown in FIG. 5, the forward wall serves as a support for the spring 206. The interior wall 244 includes six hex surfaces 252 extending substantially axially forward from the end face 226 to the stop surface 214 (FIG. 5). In the configuration shown in FIG. 8, six stop surfaces are provided against which corresponding surfaces on the forward phase 212 of the hex head will stop. The hex surfaces 250 to terminate the stop surfaces.

The stop surfaces 214 extend substantially radially inward to a substantially cylindrical bore 254 (FIGS. 8, 10 and 12). The bore 254 helps to support the spring 206. The axial length of the hex surfaces 252 may be approximately twice the axial length of the bore 254.

The nut portion 204 (FIGS. 13-17) includes the hex head 210 having outward facing hex surfaces 256 complementary to the hex surfaces 252 in the body portion. The two sets of hex surfaces substantially prevent or limit rotation between the body portion and the nut portion, while allowing axial movement between them. In other examples, the rotation-limiting surfaces of the body portion and the nut portion can be other than exactly complementary while still limiting or preventing relative rotation between the body portion and the nut portion. When assembled, and in the resting state, the back face 258 (FIG. 15) of the nut portion is substantially flush with the back face 226 (FIG. 8) of the body portion. The axial length of the hex phases 256 is less than the actual length of the hex phases 252 in the body portion by the desired amount of axial movement between the body portion and the nut portion. The hex head terminates in a forward facing surface 260, part of which contact the stop surfaces 252 (FIG. 8).

The forward facing surface 260 transitions to a cylindrical wall 262. The cylindrical wall extends forward to a circumferential groove 264 formed in the outside of the nut portion. The depth of the groove 264 from the cylindrical surface 262 is configured so that the resilient elements 218 in the body portion can move easily along the groove surface. The axial length of the groove 264 is made sufficiently greater than the axial distance from the forward facing surface 262 the stop surfaces 252 so that the cylindrical wall 262 makes no contact with the resilient elements 218.

The groove 264 terminates at the shoulder 216. The shoulder includes a substantially radially extending, backward facing circumferential surface 266. The surface 266 is substantially flat and extends radially outward in a transverse plane to conform with the flat surfaces 240 of the resilient elements 218 in the body portion. The surface 266 in conjunction with the flat faces 240 stop or prevent withdrawal of the nut portion from the body portion, for example through the bias of the spring 206. In other examples, the surface 266 can take other geometries, but it is desirable to have a relatively high surface area of contact between the shoulder 216 and the respective resilient elements 218.

The surface 266 terminates at a substantially cylindrical wall 268 (FIGS. 14 and 16-17). The wall 268 extends substantially axially forward from the groove 264 to a ramp or camming surface 270 (FIGS. 13-14 and 16-17). The ramp surface 270 terminates at a radially extending forward face 272 of the nut portion. The ramp surface 270 is configured to make relatively easy the assembly of the nut portion into the body portion along with the desired flexing of the resilient elements 218. The outside diameter of the shoulder 216, as defined by the cylindrical wall 268, can be selected so as to provide the desired ease of assembly of the two parts while still providing sufficient surface area of contact with the corresponding contact surfaces on the resilient elements once the resilient elements returned to their normal resting positions after assembly.

The threaded bore extends from the back face 258 of the nut portion to chamfer 274. The chamfer 274 defines the end of a counter bore 276.

The methods of making the body portion and the nut portion depend on the materials from which they are formed. Steel, aluminum or some plastic formations would require machining, while other metals can be molded, including powder metals. Plastics and composites can also be molded, and some composites can be formed into structures through layup of fibers. Given the structures disclosed herein, one skilled in the art can understand how each of the portions can be formed.

Once each portion has the desired configuration, they are assembled by placing a spring 206 in the first opening 246 of the body portion 202. The spring is placed against or allowed to rest against the forward surface 250, and the hex surfaces 256 are aligned with the hex surfaces 244 in the body portion and the forward part of the nut portion inserted into the interior of the body portion. When the ramp surface 270 of the nut portion contacts the rearwardly-facing surface portions of the resilient elements 218, the nut portion is pressed against the resilient elements. The ramp surface 270 and the shoulder 216 flex one or more of the resilient elements 218, and further advance of the nut portion puts the cylindrical surface 268 of the shoulder passed the forward surfaces 240 of the resilient elements. The nut portion 204 can then be released, and the spring bias returns the nut portion until the backward surfaced 266 contacts the surfaces 240 on the resilient elements 218. The assembly can then be placed on a threaded bolt or other structure and used and operated according to other nut assemblies on similar structures. One such structure is the hold-down assembly shown in FIG. 1. Depending on the configuration of the nut assembly, the locking cup or catch may require removal of some material from the area adjacent the washer to make room for part of the nut assembly.

Figure 18:
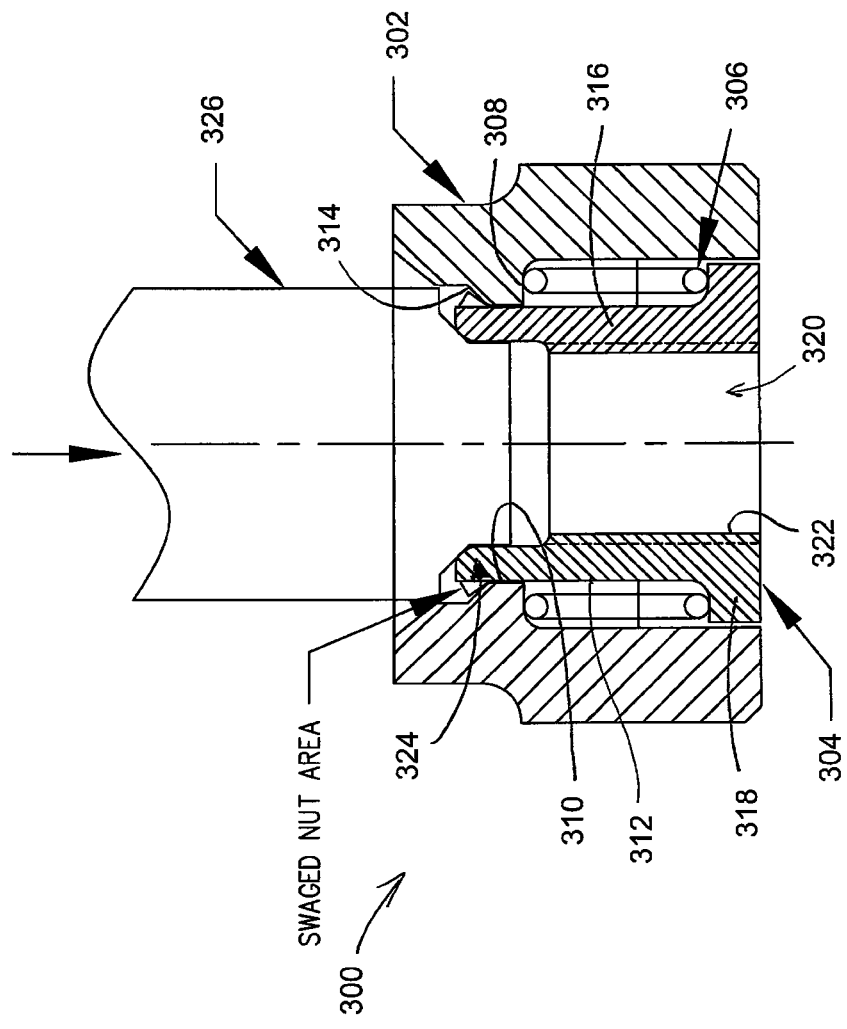
FIG. 18 is a longitudinal cross-section of an alternative nut assembly for use with the assembly shown in FIG. 1, showing a portion of a nut element in an un-swaged configuration and in a swaged configuration and a schematic of a swage tool.

An alternative apparatus and an alternative method of formation and assembly is depicted in FIG. 18. All of the features of the body portion, the nut portion and the spring may be, and in the present example are, identical to those structures described elsewhere herein except for the axial-movement limiting structures, used for limiting relative axial movement between the body portion and the nut portion, and for substantially preventing the spring from injecting or completely pushing the nut element out of the body portion.

In the present example described with respect to FIG. 18, a nut assembly 300 includes a body portion 302 and a nut portion 304. A compression spring 306 is identical in structure, function and result to the compression spring 206 described previously. The body portion 302 and the nut portion 304 include complementary surfaces for limiting or preventing rotational movement relative to each other. These surfaces are substantially identical to those described herein, but they may be modified also has disclosed herein. For present purposes, the body portion 302 is considered to include hex surfaces and the nut portion 304 is also considered to include a hex head for engaging each other and substantially preventing rotation relative to each other.

As in the other examples described herein, the body portion and the nut portion move axially relative to each other. In the present example, however, the spring wall 308 in the body portion 302 extends radially inwardly to define a substantially continuous, circular wall 310 within which a substantially cylindrical wall 312 extends. The cylindrical wall 312 on the nut portion may be dimensioned so as to closely fit within the circular wall 310 while still allowing relatively easy axial movement under the bias of the spring 306, except as limited in the direction in which the spring biases the nut portion. The circular wall extends axially of the body portion to an outwardly-facing surface 314, which outwardly-facing surface may diverge outwardly, or may define a radially-extending surface forming a counter bore. The outwardly-facing surface 314 forms a stop surface or axial limiting surface for limiting axial movement of the nut portion relative to the body portion.

In its un-assembled form, the nut element 304 includes a substantially cylindrical wall 316 extending distally from the hex head 318 of the nut element. The distal portion or surface of the hex head 318 forms a bearing surface for the spring 306. The cylindrical wall 316 defines a bore 320 through the nut element, which includes threads or other engagement surfaces 322 as would be known to those skilled in the art. The distal end portion 324 of the cylindrical wall 316 in the present configuration is substantially a continuous annular wall having a substantially annular or tubular transverse cross section. The interior surface of the distal end portion of the cylindrical wall may be radiused, angled or chamfered. The length of the cylindrical wall is chosen so that a length of the distal portion extends beyond the outwardly-facing surface 314 of the body portion when the nut element 304 is inserted into the body portion. When the desired length of the cylindrical wall extends beyond the outwardly-facing surface 314, the distal end portion of the cylindrical wall can be swage outward into contact with or over the outwardly-facing surface 314 using a swage tool such as that depicted schematically at 326. In that configuration, the swaged surface in combination with the outwardly-facing surface 314 on the body portion form axial-movement limiting structures to retain the nut element in the body portion, against the bias of the spring 306. Other forms of the outwardly-facing surface 314 and the distal portion of the cylindrical wall in combination can be used to limit the axial movement of the body portion and the nut portion relative to each other.

The body portion and the nut portion can be made from a number of materials, and may each be formed from the same or different materials from the other. For example, they can be made from metal, structural plastics, powdered metals, as well as other materials. The nut portion can be formed from steel, aluminum, Torlon®, and other poly-amide imides, as well as other structural or engineered plastics or polymers, including among others; Vespel or Aurum (PI), Ultem (PEI), Victrex or Ketaspire (PEEK), Primospire (SRP), Polycarbonate, or Epoxide or Phenolic synthetic resins, or powdered metals. Where the loading is relatively light on the nut assembly, Torlon® may be a suitable material for the nut portion. Under heavier load conditions, powdered metal is a good material for making the nut portion easier to fabricate. The body portion can be made from a similar variety of materials, and under heavy and light load conditions, the body portion can even be made from lighter plastics, such as Torlon®, or composites. The spring internal to the body portion biasing the nut portion out of the body portion can be any conventional spring used in such applications.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A hold down nut comprising:
   a body portion having an outer surface configured for manual gripping, the body portion further including first and second wall portions defining respective first and second openings and an internal wall between the first and second openings, and a spring retaining wall between the first and second openings, and a rotation-inhibiting wall between the first and second openings;
   a nut portion configured to move axially within the internal wall of the body portion, the nut portion including surface portions configured to allow the nut portion to advance along a threaded surface, the nut portion further including a second surface complimentary with the rotation-inhibiting wall in the body portion, the nut portion further including a spring wall permitting a spring to extend around the spring wall;
   a spring extending between the body portion and the nut portion and extending around and longitudinally along the nut spring wall and configured to bias the body and nut portions apart; and
   the nut further including resilient structures on at least one of the body portion and the nut portion configured to allow assembly of the body portion and the nut portion while also restricting disassembly.

2. The nut of claim 1 wherein the body portion further includes at least one axially-extending wall extending at least partly adjacent a wall of the nut portion and wherein the at least one axially-extending wall is radially flexible relative to the wall of the nut portion.

3. The nut of claim 1 wherein at least one of the body portion and the nut portion includes at least one axially-extending wall radially flexible relative to a central axis of the nut.

4. The nut of claim 3 wherein the at least one axially-extending wall is on the body portion and extends adjacent a wall on the nut portion.

5. The nut of claim 4 wherein the flexible wall is positioned adjacent the second opening of the body portion, includes a portion that extends radially inwardly relative to the body portion, and extends arcuately adjacent the second opening of the body portion.

6. The nut of claim 4 wherein the body portion includes a plurality of flexible walls adjacent the second opening of the body portion.

7. The nut of claim 6 wherein the plurality of flexible walls extend arcuately to form a substantially circular opening where adjacent flexible walls are separated from each other by a groove.

8. The nut of claim 1 wherein the rotation inhibiting wall is a non-circular internal wall extending from the first opening toward the second opening, and wherein the nut portion includes a non-circular wall extending adjacent a portion of the non-circular internal wall of the body portion.

9. A hold down nut assembly comprising:
   a body portion having an outer surface configured for turning the body portion with a tool or manually;
   a nut portion extending within and axially movable relative to the body portion and wherein the nut portion and the body portion have respective surfaces limiting rotation between the nut portion and the body portion, and wherein at least one of the nut portion and the body portion include a flexible element for contacting a less-flexible portion on the other of the nut portion and the body portion and wherein the flexible element and the less-flexible portion are configured so that when the body portion and the nut portion are fully assembled, the flexible element and the less-flexible portion limit axial movement of the body portion and the nut portion relative to each other; and
   a spring between the body portion and a nut portion biasing the body portion and the nut portion axially apart.

10. The assembly of claim 9 wherein the flexible element is positioned on the body portion and wherein the body portion includes a plurality of flexible elements extending circumferentially around an opening in the body portion.

11. The assembly of claim 10 wherein adjacent ones of the plurality of flexible elements are separated by respective grooves.

12. The assembly of claim 10 wherein the body portion includes a radially-extending wall at a second end portion and wherein the flexible element is positioned on an interior portion of the radially-extending wall.

13. The assembly of claim 12 wherein the flexible element includes an axially-extending structure terminating in an outwardly-facing surface.

14. The assembly of claim 9 wherein the body portion is a monolithic structure and the nut portion is a monolithic structure.

15. The assembly of claim 14 wherein the body portion is formed from a non-metal material and the nut portion is formed from a metal, and wherein the flexible element extends a distance less than a complete perimeter of the body portion.

16. The assembly of claim 9 wherein the flexible element includes a plurality of flexible elements defining a second opening opposite opening in the body portion, and wherein the flexible elements include respective surfaces, wherein the nut portion further includes at least one contact surface for contacting one of the respective surfaces on the flexible elements, and wherein contact between the contact surface and the respective surface on a flexible element limits relative axial movement of the nut portion and the body portion.

17. A method of assembling a nut assembly for a locking clamp bolt comprising aligning a body portion and a nut portion and engaging the body portion and the nut portion in such a way as to substantially limit rotation of the nut portion and the body portion relative to each other, moving the body portion and the nut portion together while rotation between the nut portion and the body portion is limited, pressing the body portion and the nut portion against each other to flex at least one resilient element in such a way as to allow a portion at adjacent the at least one resilient element to pass the at least one resilient element in a first direction; and substantially limiting through the at least one resilient element movement of the body portion and the nut portion in a second direction opposite to first direction.

18. The method of claim 16 wherein pressing the body portion and the nut portion against each other causes a flexible element on the body portion to flex outward and ride over a portion of a surface on the nut portion.

19. The method of claim 18 wherein further pressing of the body portion and a nut portion against each other after flexing of the flexible element moves the portion of the surface on the nut portion beyond the flexible element, and allowing the flexible element to return into contact with the nut portion.

\* \* \* \* \*